US008896960B2

(12) United States Patent
Bates et al.

(10) Patent No.: US 8,896,960 B2
(45) Date of Patent: *Nov. 25, 2014

(54) TIMING-BASED SERVO FOR DETERMINING LATERAL HEAD VELOCITY

(71) Applicant: International Business Machines Corporation, Armonk, NY (US)

(72) Inventors: Allen K. Bates, Tucson, AZ (US); Nhan X. Bui, Tucson, AZ (US); Nils Haustein, Soergenloch (DE); Stephen L. Schwartz, Tucson, AZ (US); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/049,418

(22) Filed: Oct. 9, 2013

(65) Prior Publication Data

US 2014/0036386 A1 Feb. 6, 2014

Related U.S. Application Data

(63) Continuation of application No. 13/551,667, filed on Jul. 18, 2012, now Pat. No. 8,619,384.

(51) Int. Cl.
*G11B 20/20* (2006.01)

(52) U.S. Cl.
USPC ......................................... 360/76; 360/77.12

(58) Field of Classification Search
None
See application file for complete search history.

(56) References Cited

U.S. PATENT DOCUMENTS

| 6,359,748 | B1 | 3/2002 | Goker |
| 7,433,144 | B2 | 10/2008 | Singer |
| 7,620,739 | B2 | 11/2009 | Singer et al. |
| 7,961,424 | B2 | 6/2011 | Cherubini et al. |
| 8,094,407 | B2 | 1/2012 | Cherubini et al. |
| 8,619,384 | B1 | 12/2013 | Bates et al. |
| 2007/0121240 | A1 | 5/2007 | Duran |
| 2011/0102934 | A1 | 5/2011 | Bui et al. |
| 2011/0199701 | A1 | 8/2011 | Bui et al. |

OTHER PUBLICATIONS

Muthuthamby Sri-Jayantha. "Feedback Control of Impact Dynamics of a Moving-Coil Actuator". pp. 277-284. IEEE Transactions on Industrial Electronics, vol. IE-34, No. 2. May 1987.

*Primary Examiner* — Paul Huber
(74) *Attorney, Agent, or Firm* — David Zwick; Jennifer M. Anda

(57) ABSTRACT

A servo track has servo pattern frames including two pairs of parallel transitions, the transitions of each pair spaced apart an equal distance, the first pair at an azimuth angle, the second pair at the opposite azimuth angle. A servo channel receives signals at first times corresponding to a servo read head detecting the transitions of the first pair of parallel transitions of a servo pattern frame, and second times corresponding to the servo read head detecting the transitions of the second pair of parallel transitions. The servo channel determines a relative lateral movement and velocity between the tape and the tape head based on respective functions of the ratio $(T_D-T_C)/(T_B-T_A)$, distance d, and constants proportional to the azimuth angle and the trajectory angle.

9 Claims, 6 Drawing Sheets

US 8,896,960 B2

TIMING-BASED SERVO FOR DETERMINING LATERAL HEAD VELOCITY

CROSS REFERENCE TO RELATED APPLICATIONS

This application is a continuation of U.S. patent application Ser. No. 13/551,667, filed Jul. 18, 2012, the entire disclosure of which is incorporated herein by reference.

FIELD OF THE INVENTION

The present invention relates generally to tape drive systems having a timing-based servo for positioning a head, and more particularly to a system for determining lateral head movement and velocity based on servo track timing measurements.

BACKGROUND

Densities for linear tape storage systems are at a point where precision lateral positioning of the tape heads perpendicular to the longitudinal direction of motion of the tape is a requirement. Timing-based servo (TBS) is a technology developed in the mid-1990s for linear tape drives to specifically address this issue. In TBS systems, recorded servo patterns consist of transitions with two different azimuthal slopes, and head lateral-position relative to the servo track is derived from the relative timing of pulses generated by a narrow servo tracking head reading the pattern.

A popular tape drive technology that has adopted the TBS standard is Linear Tape Open (LTO). Linear Tape Open and LTO are registered trademarks of Hewlett-Packard Company, International Business Machines Corporation, and Quantum Corporation. In LTO, the tape width is divided into four data bands sandwiched between five narrow servo bands or tracks. Each servo band has a TBS pattern that is written to the servo band during the tape manufacturing process. The tape head assembly straddles two adjacent servo bands, with two or more servo read heads and 8 or 16 data read/write heads. Each data head moves up and down within its own data sub-band the same width as the servo band.

As the servo track deviates from the ideal centerline positioning relative to the servo tracking head, the servo control will activate and move the servo tracking head to follow the servo track. The actuator that enables precise positioning of the read head, utilizing the servo system, can involve an arrangement in which the head actuator assembly is suspended using a spring system that possesses mass and stiffness. Such an actuator suspension and servo system has resonant frequencies with the first natural resonance mode typically having a frequency below the closed loop bandwidth. In other arrangements, resonance modes may occur in various shafts, cantilevered arms, and other moving and fixed parts of the actuator assembly. Thus, another issue involving tape heads is effective damping of the tape head actuator. A factor in determining such effective damping is the velocity of the tape head actuator in the lateral direction.

SUMMARY

Embodiments of the present invention provide a method to determine a relative lateral movement and velocity between the tape and the tape head. The method operates in a servo system for positioning a tape head laterally to follow lateral motion of a longitudinal tape moving in a substantially longitudinal direction with respect to the tape head. The tape has at least one longitudinal defined servo track that includes a longitudinal series of identical servo pattern frames. Each servo pattern frame includes two pairs of non-overlapping parallel magnetic transitions, the transitions of each pair being spaced apart an equal distance d. The transitions of the first pair form an azimuth angle to the longitudinal axis of the tape, and the transitions of the second pair form the azimuth angle to the longitudinal axis of the tape but at an opposite slope about the lateral axis of the tape. The servo system includes an actuator configured to move the tape head laterally with respect to the longitudinal tape. The tape head includes a servo read head configured to read the servo pattern frames in the servo track and produce servo signals. A servo channel is configured to receive and process the servo signals. A position error signal loop is configured to sense the servo signals, to determine position error between the servo read head and a desired center-line position of the at least one defined servo track based on the servo signals, and to operate the actuator to move the tape head laterally to reduce the determined position error. The method to determine a relative lateral movement and velocity between the tape and the tape head includes the servo read head reading a servo pattern frame in the servo track. The relative movement of the servo head with respect to the tape forms a trajectory angle with respect to the center-line of the at least one defined servo track. The trajectory of the servo read head intersects the first and second transitions of the first pair of parallel transitions of the servo pattern frame at times $T_A$ and $T_B$, respectively, and intersects the first and second transitions of the second pair of parallel transitions of the servo pattern frame at times $T_C$ and $T_D$, respectively. The servo read head produces servo signals at times $T_A$, $T_B$, $T_C$, and $T_D$. The servo channel determines a relative lateral movement $LM_{AB}$ or $LM_{CD}$ between the tape and the actuator between times $T_A$ and $T_B$, or times $T_C$ and $T_D$, respectively, at least as respective functions of the ratio $(T_D-T_C)/(T_B-T_A)$, distance d, and constants proportional to the azimuth angle and the trajectory angle.

DETAILED DESCRIpTION

Embodiments of the present invention will now be described in detail with reference to the accompanying drawings.

Figure 1:
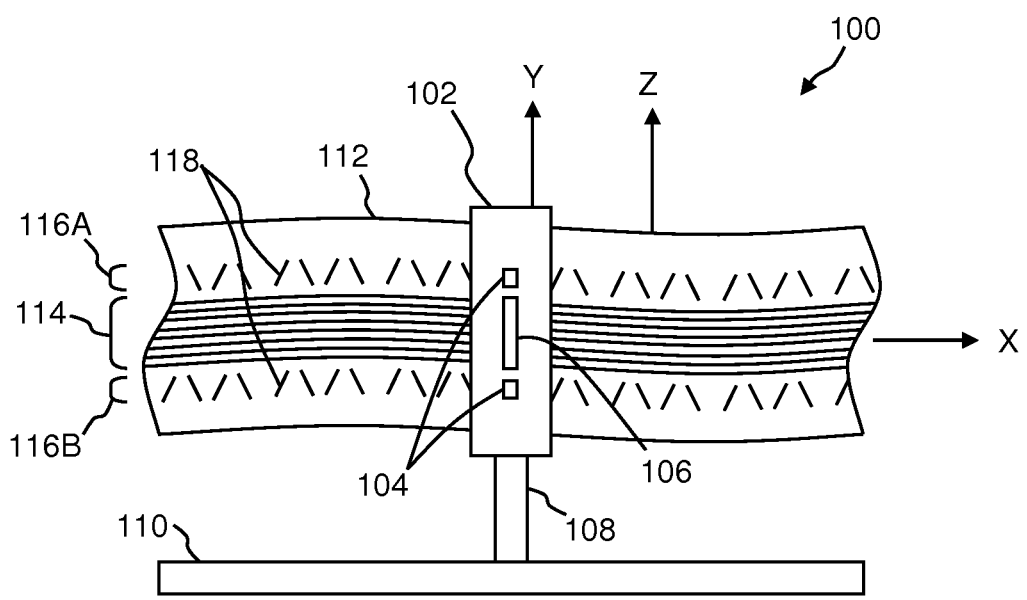
FIG. 1 is a simplified component view of a time-based servo system, in accordance with embodiments of the present invention.

FIG. 1 is a simplified component view of a time-based servo system 100, in accordance with embodiments of the present invention. Tape head actuator 102 includes narrow servo read heads 104 and data read/write head 106. Base plate 110 supports actuator shaft 108. Tape head actuator 102 moves along actuator shaft 108 in the lateral Y direction via a servo motor or electromagnet (not shown). Typically, tape head actuator 102 includes or is connected to a stepper motor arrangement for gross movements, and a voice coil arrangement for fine movements. For simplicity, these details are not shown. Tape 112 represents a portion of a linear tape medium that is ideally moving in the longitudinal X direction. Tape 112 includes a data track 114, shown with eight sub-tracks, sandwiched between two servo tracks 116A and 116B that have been imprinted during the tape manufacturing process with a magnetic servo pattern 118 that consists of transitions with two different azimuthal angles, which will be described in greater detail below. Although only a single data track 114 is shown, a tape 112 typically has several data tracks separated by servo tracks. In addition, each data track typically includes several sub-tracks, and data read/write head 106 will include several read/write heads.

In operation, tape 112 moves in the X direction past tape head actuator 102. Servo read heads 104, which are small in the lateral dimension in comparison to servo tracks 116, detect servo patterns 118 in servo tracks 116A and 116B. Based on the timing of pulses generated by servo read heads 104 reading servo patterns 118, the position in the lateral Y direction of servo read heads 104 relative to the position of the servo tracks in the lateral Z direction can be determined. Typically, there is some movement of tape 112 in the lateral Z direction relative to the ideal longitudinal X direction of travel, as indicated in FIG. 1 by the slight "wave" shape of tape 112. To keep data read/write head 106 in good alignment with data track 114, a state variable feedback system controls the servo that moves tape head actuator 102 along actuator shaft 108 in the Y direction based on the relative position of servo read heads 104 and the ideal position relative to servo tracks 116A and 116B, which may be the centerline of servo tracks 116A and 116B or may be a lateral offset to that centerline.

Figure 2:
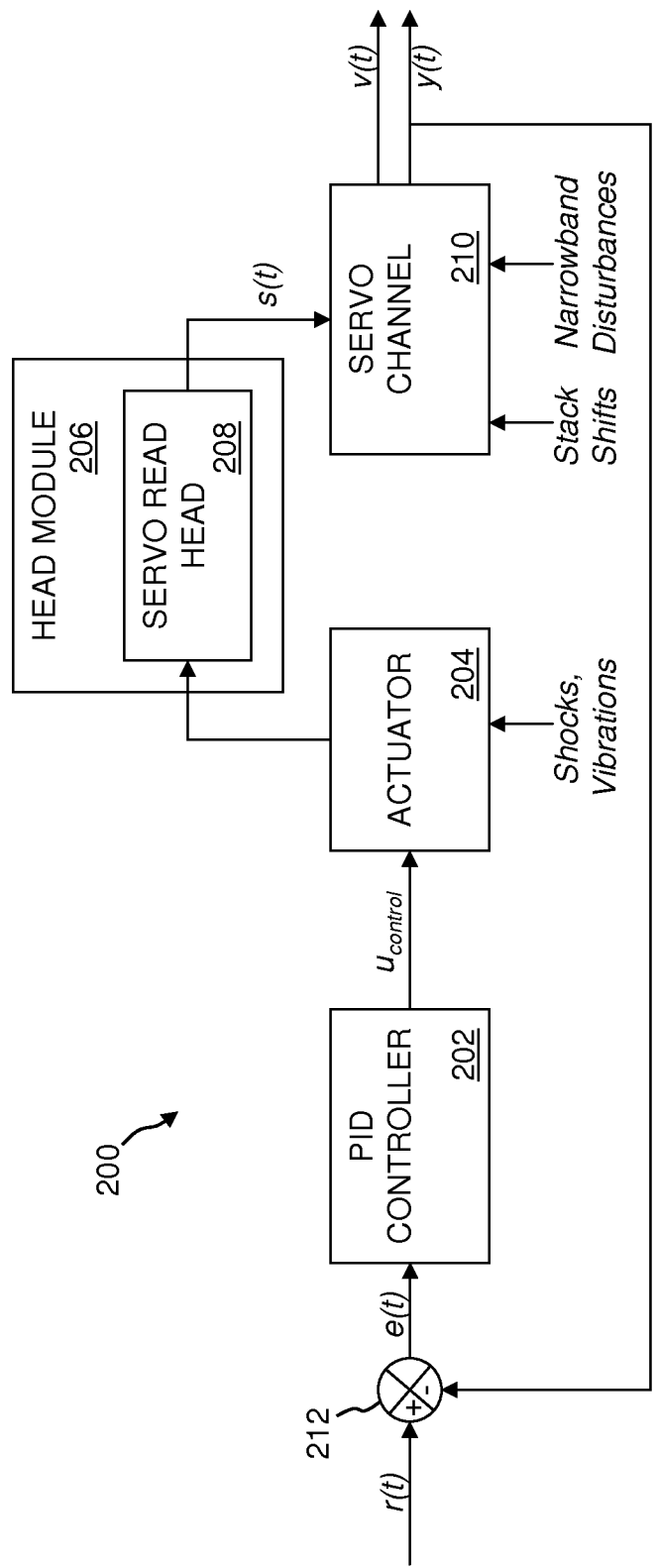
FIG. 2 is a simplified block diagram of a typical time-based servo control system.

FIG. 2 is a simplified block diagram of a typical time-based servo control system 200. The servo control system 200 is based on a position error signal loop utilizing a proportional-integral-derivative (pID) controller 202. The servo control system 200 includes pID controller 202, actuator 204, a head module 206, at least one servo read head 208 located in or on the head module 206, a servo channel 210, and a subtractor 212. FIG. 2 also shows various disturbances that are often present in tape drive systems (e.g., shocks, vibrations, stack shifts, and narrowband disturbances). FIG. 2 further shows a reference signal r(t), which is the reference signal associated with, for example, the centerline of servo tracks 116 to which servo read head 208 should be tracking, a position error signal (pES) e(t), and a control signal $u_{control}$, a signal s(t) provided by servo read head 208 to servo channel 210, a tape velocity estimate signal v(t), and a lateral position estimate signal y(t). pES e(t) corresponds to the difference between reference signal r(t) and lateral position estimate signal y(t). With regard to FIG. 1, actuator 204 and head module 206 correspond generally to tape head actuator 102, and servo read head 208 corresponds to servo read heads 104. Servo channel 210 may be implemented, for example, as a microprocessor with microcode instructions stored either inside servo channel 210 or in a separate EpROM (not shown), or as a field-programmable gate array (FpGA), or as an application-specific integrated circuit (ASIC), or as a combination of the foregoing, or any other computing device capable of performing the functionality required in embodiments of the invention.

In operation, servo control system 200 uses the pES e(t) as an input to pID controller 202. pID controller 202 outputs control signal $u_{control}$ to actuator 204. Based on the control signal $u_{control}$, the actuator 204 adjusts the position of the head module 206, which in turn determines the position of servo read head 208 and corresponding read/write heads (not shown). The read/write heads are maintained at a desired "on track" position via motion of the actuator and also via feedback provided by the servo read head 208. Specifically, servo read head 208 provides a signal s(t) to the servo channel 210. The servo channel 210 processes the signal s(t) to generate a lateral position estimate signal y(t) and a tape velocity estimate signal v(t), which indicates an estimate of the longitudinal velocity of the tape being read/written. Lateral position estimate signal y(t) along with reference signal r(t) is input to subtractor 212, which outputs the PES difference signal e(t).

In the embodiments shown in FIGS. 1 and 2, actuator 204 typically experiences vibrational resonances that must be controlled. The mechanical behavior of actuator 204 may be approximated by a simple spring-damper-mass model. As is known in the art, a state-space form of the differential equations representing a spring-damper-mass model is as follows:

$$\begin{bmatrix} \frac{dy}{dt} \\ \frac{d^2y}{dt^2} \end{bmatrix} = \begin{bmatrix} 0 & 1 \\ \frac{-k}{m} & \frac{-c}{m} \end{bmatrix} \begin{bmatrix} y \\ \frac{dy}{dt} \end{bmatrix} + \begin{bmatrix} 0 & 0 \\ Kf & Cf \end{bmatrix} \begin{bmatrix} z-y \\ \frac{dz}{dt} - \frac{dy}{dt} \end{bmatrix}. \quad (1)$$

In equation (1), all elements are known, except for $$z - y,$$

and $$\frac{dz}{dt} - \frac{dy}{dt}.$$

In equation (1), m is the mass of tape head actuator 102 in kilograms, including any additional mass attributed to, for example, head cables and servo motors to be overcome when accelerating tape head actuator 102 in the Y direction; k is the mechanical spring rate of tape head actuator 102 in the Y direction, in Newtons per meter; and c is the mechanical damping experienced by tape head actuator 102 in the Y direction, in Newton-seconds per meter. Additionally, Kf is the feedback coefficient with units of seconds$^{-2}$ and Cf is the feedback coefficient with units of second$^{-1}$.

Figure 3:
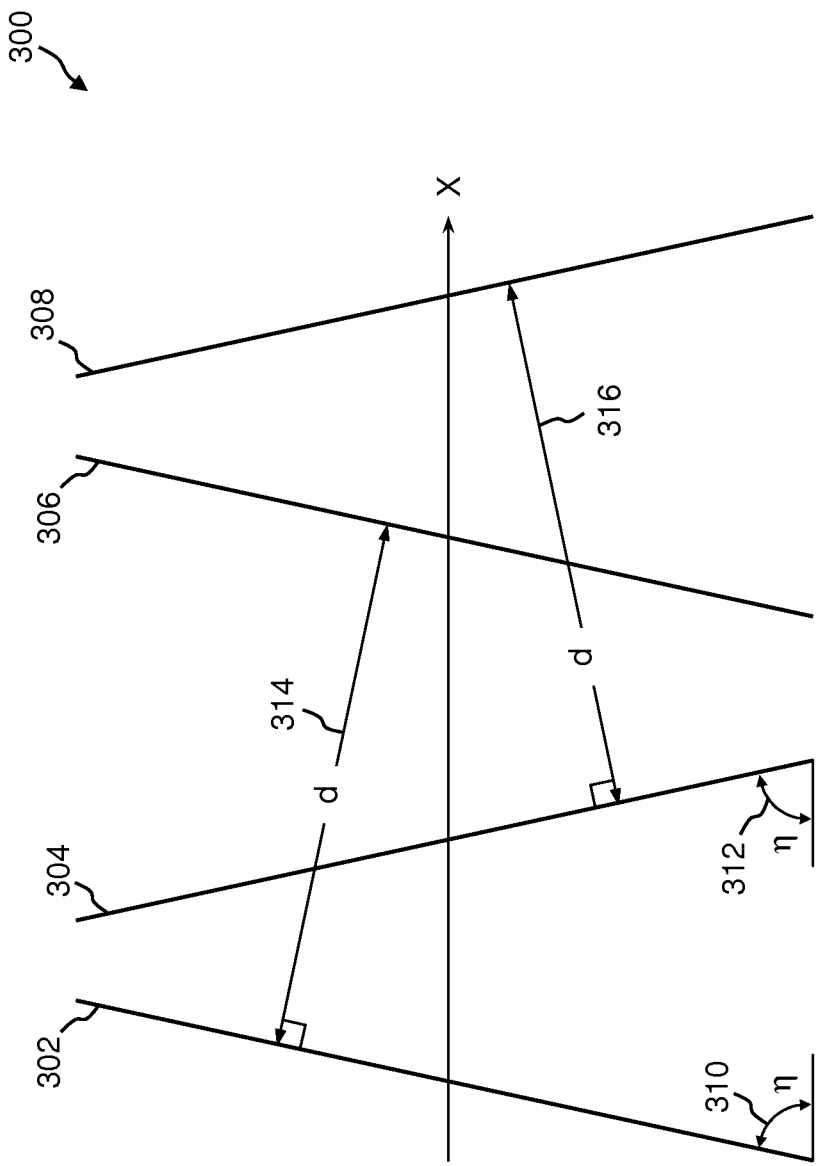
FIG. 3 illustrates a frame of a TBS servo pattern in accordance with embodiments of the invention.
Figure 4:
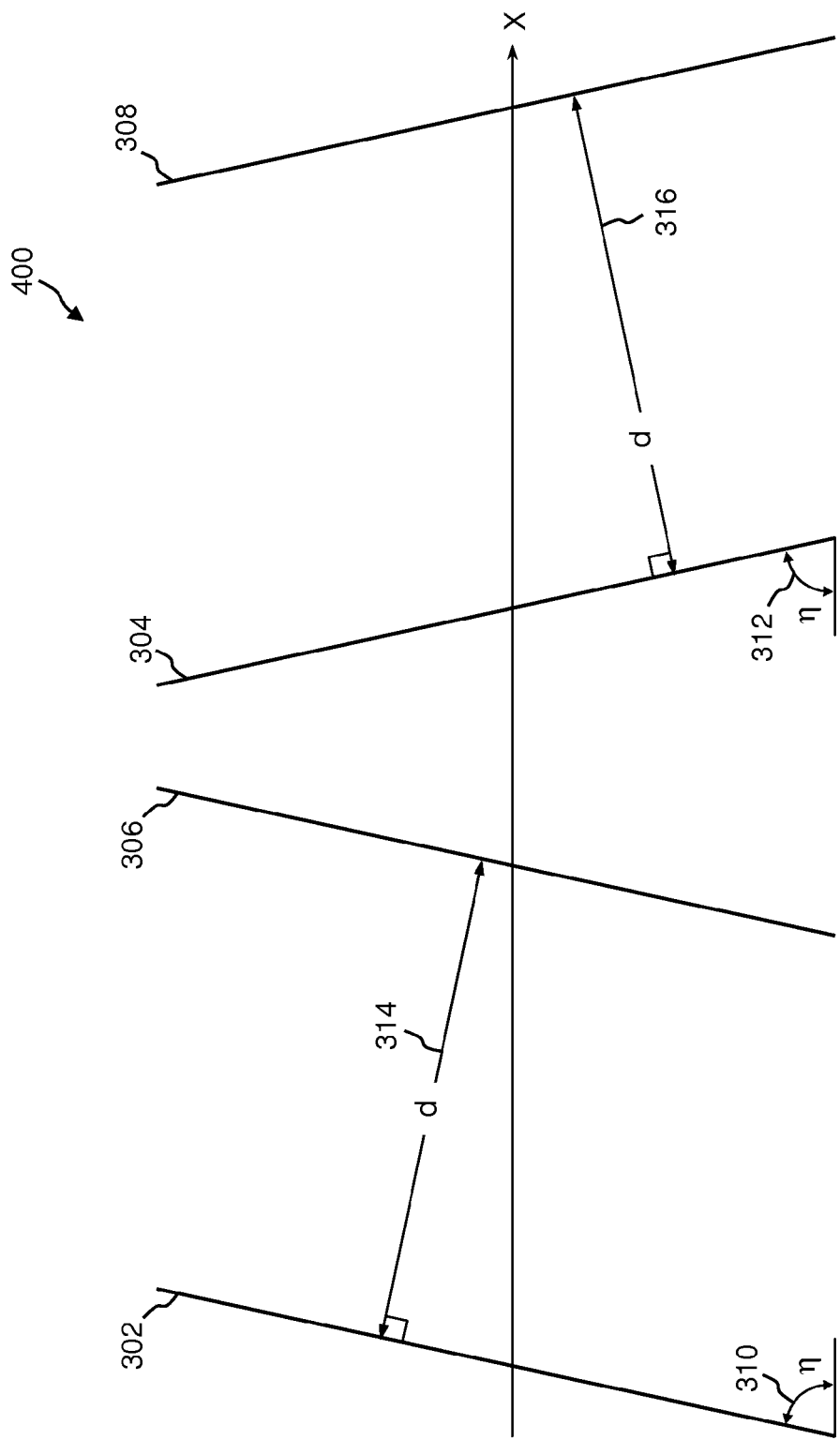
FIG. 4 illustrates a frame of a second TBS servo pattern in accordance with embodiments of the invention.

FIGS. 3 and 4 each illustrate a frame of a TBS servo pattern in accordance with embodiments of the invention by which the terms $$z - y,$$

and $$\frac{dz}{dt} - \frac{dy}{dt}$$

can be derived from the relative timing of pulses generated by a servo read head 104 reading the servo pattern, such as servo pattern 118 in FIG. 1. Servo pattern frames 300 and 400 each comprise two sets of parallel transitions, each set having equal azimuth angles to the centerline of the TBS servo track but opposite to the other set, and which no transitions cross each other. Although for ease of explanation the azimuth angles are stated with respect to the servo track centerline, any parallel to the centerline can be used. In alternative embodiments, servo tracks 116A and 116B include either a longitudinal series of servo pattern frames 300 or servo pattern frames 400. In FIG. 3, servo pattern frame 300 comprises parallel transitions 302 and 306, having an azimuth angle η 310 with respect to the servo track centerline X, and parallel transitions 304 and 308, having an equal azimuth angle η 312, but in the opposite direction as azimuth angle 310. parallel transitions 302 and 306 are separated by a distance 314 of length d, and parallel transitions 304 and 308 are separated by an equal distance d 316. In the arrangement shown in FIG. 3, parallel transition pair 302 and 306 is interleaved with parallel transition pair 304 and 308, forming a double chevron, or "M" shape. FIG. 4 shows an alternative arrangement with a servo pattern frame 400 in which parallel transition pair 302 and 306 are not interleaved with parallel transition pair 304 and 308. For purposes of the invention, embodiments can use either arrangement. For purposes of explanation, the interleaved pattern frame 300 of FIG. 3 will be used.

Figure 5:
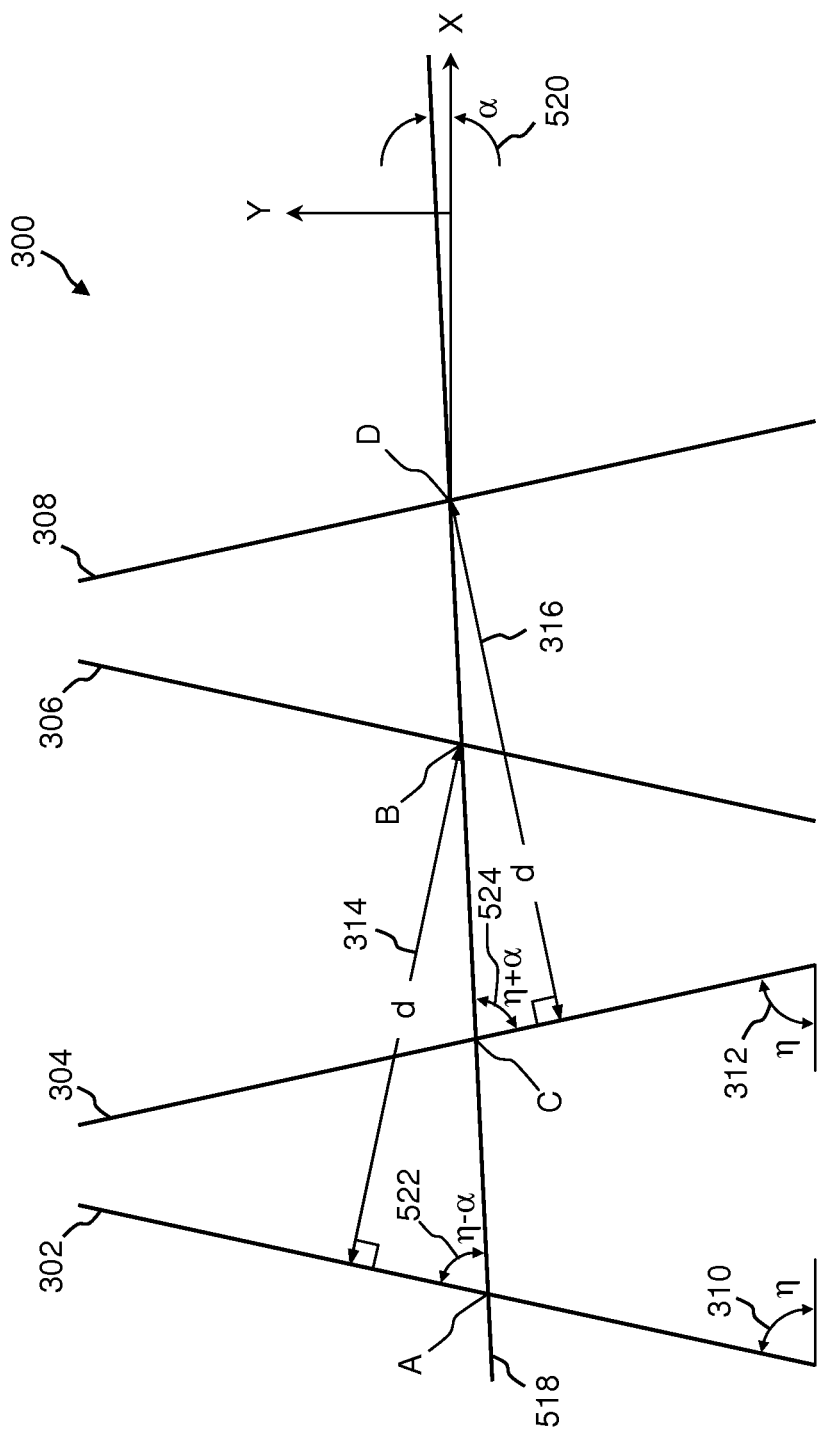
FIG. 5 illustrates the servo pattern frame of FIG. 3, including a servo head trajectory.

FIG. 5 illustrates the servo pattern frame 300 of FIG. 3, including a servo head trajectory 518. Servo head trajectory 518 represents, for example, the path over servo pattern frame 300 that a servo head 104 would follow when tape 112 is experiencing movement in the negative lateral Y direction as it moves in the longitudinal X direction. Servo head trajectory 518 forms a positive angle α 520 with the X direction. As illustrated, servo head trajectory 518 also forms an angle (η−α) 522 with parallel transition pair 302 and 306, and an angle (η+α) 524 with parallel transition pair 304 and 308. Servo head trajectory 518 crosses parallel transition pair 302 and 306 at points A and B, respectively, and crosses parallel transition pair 304 and 308 at points C and D, respectively. In practice, as adjustments are made by servo control system 200 to keep the read/write heads of tape head actuator 102 on track, trajectory angle α 520 will change. However, within a servo pattern frame 300, servo head trajectory 518 can be considered to be linear, and trajectory angle α 520 as constant.

Figure 6:
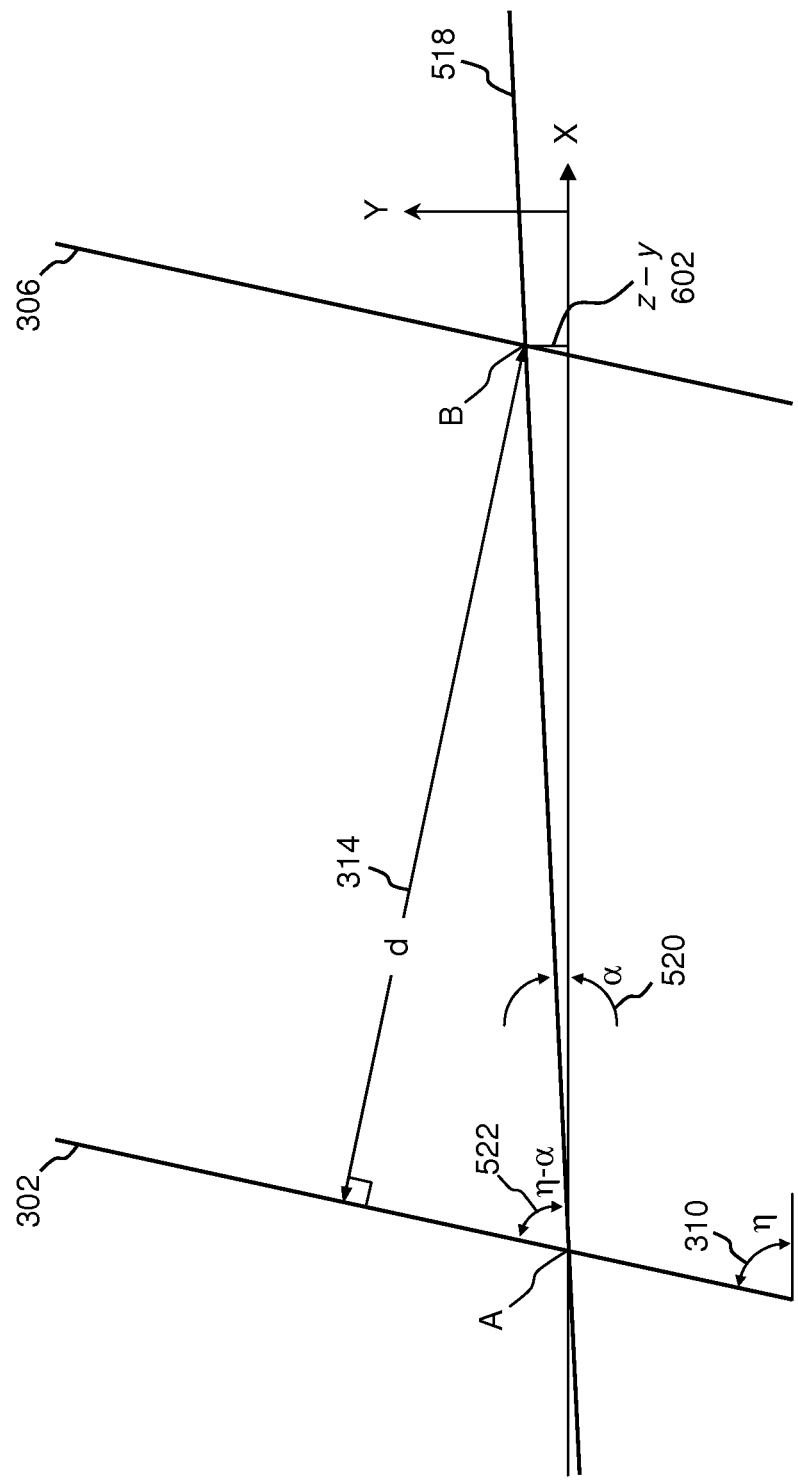
FIG. 6 illustrates a detail of the servo pattern frame of FIG. 3, including a servo head trajectory.

In equation (1), the term z−y represents a relative movement of tape 112 in the lateral Z direction with respect to a movement of tape head actuator 102 in the lateral Y direction (see FIG. 1). This may be most easily understood as a movement of tape 112 from an observational frame of reference tied to tape head actuator 102. FIG. 6 shows a detail of FIG. 5 relating to parallel transition pair 302 and 306. With reference to FIG. 6, (z−y) 602 represents the lateral movement of a servo read head 104 in the Y direction as a servo read head 104 traverses a path over servo pattern frame 300 between points A and B along servo head trajectory 518. As can be seen from FIG. 6, $$\sin(\alpha) = \frac{(z-y)_{AB}}{AB}, \quad (2)$$

where AB is the length of the segment between points A and B that a servo read head 104 traverses along servo head trajectory 518, and $(z-y)_{AB}$ is the lateral movement in the Y direction of tape head actuator 102 as it traverses segment AB. The length of segment AB can be expressed in terms of tape velocity by the equation:

$$AB = V_{TapeAB} * (T_B - T_A), \quad (3)$$

where $V_{TapeAB}$ is the velocity of the tape as detected by a servo read head 104 along segment AB, and $(T_B - T_A)$ is the time it takes a servo read head 104 to traverse segment AB. Expressing equation (2) in terms of (z−y) and using the identity of equation (3), gives:

$$(z-y)_{AB} = \sin(\alpha) * V_{TapeAB} * (T_B - T_A). \quad (4)$$

As can be seen from FIG. 6, $$V_{TapeAB} = \frac{d}{\sin(\eta - \alpha)} * \frac{1}{(T_B - T_A)}. \quad (5)$$

Substituting the identity of equation (5) into equation (4) gives:

$$(z-y)_{AB} = \sin(\alpha) * \left[ \frac{d}{\sin(\eta - \alpha)} * \frac{1}{(T_B - T_A)} \right] * (T_B - T_A) \quad (6)$$

$$= \sin(\alpha) * \frac{d}{\sin(\eta - \alpha)}$$

$$= \sin(\alpha) * \frac{d}{\sin(\eta)\cos(\alpha) - \cos(\eta)\sin(\alpha)}.$$

Assuming trajectory angle α 520 to be a small angle, sin(α) can be approximated as α, and cos(α) can be approximated as 1. Thus, equation (6) can be expressed as the following, which defines lateral movement $LM_{AB}$:

$$(z-y)_{AB} = LM_{AB} = \alpha * \frac{d}{\sin(\eta) - (\alpha * \cos(\eta))}. \quad (7)$$

Similarly, with reference to FIG. 5, lateral movement $LM_{CD}$ is defined as:

$$(z-y)_{CD} = LM_{CD} = \alpha * \frac{d}{\sin(\eta) + (\alpha * \cos(\eta))}. \quad (8)$$

In equation (1), $$\frac{dz}{dt} - \frac{dy}{dt}$$

represents the relative velocity of tape 112 in the lateral Z direction with respect to tape head actuator 102 in the lateral Y direction. This, too, may be most easily understood as the movement of tape 112 from an observational frame of reference tied to tape head actuator 102. The term $$\frac{dz}{dt} - \frac{dy}{dt}$$

can be derived from equation (7) or equation (8) by dividing both sides of these equations by the time it takes a servo read head 104 to traverse segment AB or CD, respectively. Thus, lateral velocities $LV_{AB}$ and $LV_{CD}$ are defined as follows:

$$\left( \frac{dz}{dt} - \frac{dy}{dt} \right)_{AB} = LV_{AB} = \alpha * \frac{d}{\sin(\eta) - (\alpha * \cos(\eta))} * \frac{1}{(T_B - T_A)}, \quad (9)$$

and

-continued $$\left(\frac{dz}{dt} - \frac{dy}{dt}\right)_{CD} = LV_{CD} = \alpha * \frac{d}{\sin(\eta) + (\alpha * \cos(\eta))} * \frac{1}{(T_D - T_C)}. \quad (10)$$

Equations (7) and (8), and (9) and (10) express the terms $$z - y,$$

and $$\frac{dz}{dt} - \frac{dy}{dt},$$

respectively, from equation (1) in terms of trajectory angle $\alpha$ 520, the angle between servo head trajectory 518 and direction X of a servo pattern frame 300 or 400. All other terms of these equations are known or can be empirically measured during operation of time based servo system 100.

With reference to FIG. 5, trajectory angle $\alpha$ 520 can be expressed as a function of the ratio of the difference in servo head transit times over segments AB and CD. With reference to FIG. 5, and as stated above, $$V_{TapeAB} = \frac{d}{\sin(\eta - \alpha)} * \frac{1}{(T_B - T_A)}. \quad (5)$$

Similarly, $$V_{TapeCD} = \frac{d}{\sin(\eta + \alpha)} * \frac{1}{(T_D - T_C)}. \quad (11)$$

Within the same servo pattern frame 300 or 400, $V_{TapeAB}$ and $V_{TapeCD}$ can be approximated as being equal, especially for the overlapping "M" configuration shown in FIG. 3. Thus, $$\frac{d}{\sin(\eta - \alpha)} * \frac{1}{(T_B - T_A)} = \frac{d}{\sin(\eta + \alpha)} * \frac{1}{(T_D - T_C)}, \quad (12)$$

or $$\frac{(T_D - T_C)}{(T_B - T_A)} = \frac{\sin(\eta - \alpha)}{\sin(\eta + \alpha)},$$

and $$\frac{(T_D - T_C)}{(T_B - T_A)} = \frac{\sin(\eta)\cos(\alpha) - \cos(\eta)\sin(\alpha)}{\sin(\eta)\cos(\alpha) + \cos(\eta)\sin(\alpha)}.$$

For the special case where azimuth angle $\eta$ 310/312 is $\pi/4$ radians, or 45 degrees, $\cos(\eta) = \sin(\eta)$, and equation (12) can be expressed as:

$$\frac{(T_D - T_C)}{(T_B - T_A)} = \frac{\cos(\alpha) - \sin(\alpha)}{\cos(\alpha) + \sin(\alpha)}. \quad (13)$$

Multiplying the right-hand side of equation (13) by $[(1/\cos(\alpha))/(1/\cos(\alpha))]$ gives:

$$\frac{(T_D - T_C)}{(T_B - T_A)} = \frac{1 - \tan(\alpha)}{1 + \tan(\alpha)}. \quad (14)$$

Expressing equation (14) in terms of $\tan(\alpha)$ gives:

$$\tan(\alpha) = \left[1 - \frac{(T_D - T_C)}{(T_B - T_A)}\right] / \left[1 + \frac{(T_D - T_C)}{(T_B - T_A)}\right],$$

or $$\tan(\alpha) = \frac{[(T_B - T_A) - (T_D - T_C)]}{[(T_B - T_A) + (T_D - T_C)]}. \quad (15)$$

Thus, $$\alpha = \operatorname{Arctan}\left(\frac{[(T_B - T_A) - (T_D - T_C)]}{[(T_B - T_A) + (T_D - T_C)]}\right). \quad (16)$$

For general azimuth angles $\eta$ 310/312, a table look-up based on equation (12) can be implemented within or called by, for example, servo channel 210 to determine trajectory angle $\alpha$ 520 based on a calculated ratio of the times $(T_D - T_C)/(T_B - T_A)$. In such a scheme, azimuth angle $\eta$ 310/312 is known. For the special case where azimuth angle $\eta$ 310/312 is $\pi/4$ radians, or 45 degrees, the table can be based on equation (16). After trajectory angle $\alpha$ 520 has been determined, values for $$z - y,$$

and $$\frac{dz}{dt} - \frac{dy}{dt}$$

can be determined with a second table look-up in a table based on equations (7) or (8), and (9) or (10). Alternatively, a single table encompassing equation (7) or (8), (9) or (10), and (15) or (16), can be used in a table look-up. For example, a table can be populated with entries that span possible values of the ratio of the times $(T_D - T_C)/(T_B - T_A)$, and an interpolation routine can determine appropriate values $LM_{AB}$, $LM_{CD}$, $LV_{AB}$, and/or $LV_{CD}$.

As will be appreciated by one skilled in the art, aspects of the present invention may be embodied as a system or method. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

Any flowcharts and block diagrams in the Figures illustrate the architecture, functionality, and operation of possible implementations of systems, methods and computer program products according to various embodiments of the present invention. In this regard, each block in a flowchart or block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

What is claimed is:

1. In a servo system for positioning a tape head laterally to follow lateral motion of a longitudinal tape moving in a substantially longitudinal direction with respect to the tape head, the tape having at least one longitudinal defined servo track, the servo track including a longitudinal series of identical servo pattern frames, each servo pattern frame including two pairs of non-overlapping parallel magnetic transitions, the transitions of each pair being spaced apart an equal distance d, the transitions of the first pair forming an azimuth angle to the longitudinal axis of the tape, the transitions of the second pair forming the azimuth angle to the longitudinal axis of the tape but at an opposite slope about the lateral axis of the tape, said servo system including an actuator configured to move the tape head laterally with respect to the longitudinal tape, the tape head including a servo read head configured to read the servo pattern frames in the servo track and produce servo signals, a servo channel configured to receive and process the servo signals, a position error signal loop configured to sense the servo signals, to determine position error between the servo read head and a desired center-line position of the at least one defined servo track based on the servo signals, and to operate the actuator to move the tape head laterally to reduce the determined position error, a method to determine a relative lateral movement and velocity between the tape and the tape head, comprising:
the servo read head reading a servo pattern frame in the servo track, the relative movement of the servo head with respect to the tape forming a trajectory angle with respect to the center-line of the at least one defined servo track, the trajectory of the servo read head intersecting the first and second transitions of the first pair of parallel transitions of the servo pattern frame at times $T_A$ and $T_B$, respectively, and intersecting the first and second transitions of the second pair of parallel transitions of the servo pattern frame at times $T_C$ and $T_D$, respectively, whereby the servo read head produces servo signals at times $T_A$, $T_B$, $T_C$, and $T_D$; and
the servo channel determining a relative lateral movement $LM_{AB}$ or $LM_{CD}$ between the tape and the actuator between times $T_A$ and $T_B$, or times $T_C$ and $T_D$, respectively, at least as respective functions of the ratio $(T_D-T_C)/(T_B-T_A)$, distance d, and constants proportional to the azimuth angle and the trajectory angle.

2. A method in accordance with claim 1, further comprising:
the servo channel determining a relative lateral velocity $LV_{AB}$ or $LV_{CD}$ between the tape and the actuator between times $T_A$ and $T_B$, or times $T_C$ and $T_D$, respectively, at least as respective functions of the ratio $(T_D-T_C)/(T_B-T_A)$, distance d, and constants proportional to the azimuth angle ($\eta$) and the trajectory angle ($\alpha$), and the reciprocal of $(T_B-T_A)$ or $(T_D-T_C)$.

3. A method in accordance with claim 1, wherein the respective functions of the ratio $(T_D-T_C)/(T_B-T_A)$, distance d, and constants proportional to the azimuth angle ($\eta$) and the trajectory angle ($\alpha$) comprise:

$$\frac{(T_D - T_C)}{(T_B - T_A)} = \frac{\sin(\eta)\cos(\alpha) - \cos(\eta)\sin(\alpha)}{\sin(\eta)\cos(\alpha) + \cos(\eta)\sin(\alpha)},$$

and $$LM_{AB} = \alpha * \frac{d}{\sin(\eta) - (\alpha * \cos(\eta))}$$

or $$LM_{CD} = \alpha * \frac{d}{\sin(\eta) + (\alpha * \cos(\eta))},$$

respectively.

4. A method in accordance with claim 2, wherein the respective functions of the ratio $(T_D-T_C)/(T_B-T_A)$, distance d, and constants proportional to the azimuth angle ($\eta$) and the trajectory angle ($\alpha$), and the reciprocal of $(T_B-T_A)$ or $(T_D-T_C)$ comprise:

$$\frac{(T_D - T_C)}{(T_B - T_A)} = \frac{\sin(\eta)\cos(\alpha) - \cos(\eta)\sin(\alpha)}{\sin(\eta)\cos(\alpha) + \cos(\eta)\sin(\alpha)},$$

and $$LV_{AB} = \alpha * \frac{d}{\sin(\eta) - (\alpha * \cos(\eta))} * \frac{1}{(T_B - T_A)},$$

or $$LV_{CD} = \alpha * \frac{d}{\sin(\eta) + (\alpha * \cos(\eta))} * \frac{1}{(T_D - T_C)},$$

respectively.

5. A method in accordance with claim 3, wherein the step of the servo channel determining the relative lateral movement $LM_{AB}$ or $LM_{CD}$ comprises:
populating a first table with entries associating a plurality of values of the ratio $$\frac{(T_D - T_C)}{(T_B - T_A)}$$

with values of the relative lateral movement $LM_{AB}$ or $LM_{CD}$ at least according to the relationships $$\frac{(T_D - T_C)}{(T_B - T_A)} = \frac{\sin(\eta)\cos(\alpha) - \cos(\eta)\sin(\alpha)}{\sin(\eta)\cos(\alpha) + \cos(\eta)\sin(\alpha)},$$

and $$LV_{AB} = \alpha * \frac{d}{\sin(\eta) - (\alpha * \cos(\eta))} * \frac{1}{(T_B - T_A)},$$

or $$LV_{CD} = \alpha * \frac{d}{\sin(\eta) + (\alpha * \cos(\eta))} * \frac{1}{(T_D - T_C)},$$

respectively;
the servo channel calculating a value for the ratio $$\frac{(T_D - T_C)}{(T_B - T_A)}$$

based on the servo signals received by the servo channel;

and the servo channel determining the relative lateral movement $LM_{AB}$ or $LM_{CD}$ by at least performing a table look-up in the first table based on the calculated ratio.

6. A method in accordance with claim 4, wherein the step of the servo channel determining the relative lateral velocity $LV_{AB}$ or $LV_{CD}$ comprises:

populating a second table with entries associating a plurality of values of the ratio $$\frac{(T_D - T_C)}{(T_B - T_A)}$$

with values of the relative velocity $LV_{AB}$ or $LV_{CD}$ at least according to the relationships $$\frac{(T_D - T_C)}{(T_B - T_A)} = \frac{\sin(\eta)\cos(\alpha) - \cos(\eta)\sin(\alpha)}{\sin(\eta)\cos(\alpha) + \cos(\eta)\sin(\alpha)},$$

and $$LV_{AB} = \alpha * \frac{d}{\sin(\eta) - (\alpha * \cos(\eta))} * \frac{1}{(T_B - T_A)},$$

or $$LV_{CD} = \alpha * \frac{d}{\sin(\eta) + (\alpha * \cos(\eta))} * \frac{1}{(T_D - T_C)},$$

respectively, the servo channel calculating a value for the ratio $$\frac{(T_D - T_C)}{(T_B - T_A)}$$

based on the servo signals received by the servo channel; and the servo channel determining the relative lateral movement $LV_{AB}$ or $LV_{CD}$ by at least performing a table look-up in the second table based on the calculated ratio.

7. A method in accordance with claim 1, wherein the first pair and second pair of non-overlapping parallel magnetic transitions are interleaved to form a double chevron, or "M", shape.

8. A method in accordance with claim 1, wherein the first pair and second pair of non-overlapping parallel magnetic transitions are sequential to form a nested chevron shape.

9. A method in accordance with claim 1, wherein the azimuth angle is $\pi/4$ radians.

* * * * *